United States Patent
Kurabayashi

(10) Patent No.: US 12,138,549 B2
(45) Date of Patent: Nov. 12, 2024

(54) SYSTEM AND METHOD FOR EXTRACTING COMBINATIONS OF ARBITRARY NUMBERS OF MEDIA, INCLUDED IN POSSESSED MEDIUM GROUP AND HAVING HIGH FREQUENCIES OF OCCURRENCE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 587 days.

(21) Appl. No.: 17/465,240

(22) Filed: Sep. 2, 2021

(65) Prior Publication Data

US 2021/0394071 A1 Dec. 23, 2021

Related U.S. Application Data

(63) Continuation of application No. PCT/JP2020/008725, filed on Mar. 2, 2020.

(30) Foreign Application Priority Data

Mar. 7, 2019 (JP) ................................ 2019-041261

(51) Int. Cl.
*A63F 13/67* (2014.01)
*A63F 13/53* (2014.01)
*A63F 13/822* (2014.01)

(52) U.S. Cl.
CPC .............. *A63F 13/67* (2014.09); *A63F 13/53* (2014.09); *A63F 13/822* (2014.09)

(58) Field of Classification Search
CPC ........ A63F 13/67; A63F 13/53; A63F 13/822; A63F 13/5375; A63F 13/35; A63F 2300/535; A63F 13/79; A63F 13/80
See application file for complete search history.

(56) References Cited

U.S. PATENT DOCUMENTS

2020/0384346 A1* 12/2020 Yoshida .................. A63F 13/69
2020/0410241 A1* 12/2020 Sundareson ............ A63F 13/44
(Continued)

FOREIGN PATENT DOCUMENTS

JP 6438612 B1 12/2018

OTHER PUBLICATIONS

Fuzzy Multiset Clustering for Metagame Analysis; by Alexander Dockhorn, Tony Schwensfeier, and Rudolf Kruse Computational Intelligence Group, Computer Science Department, Otto-von-Guericke University, Universitatsplatz 2, 39106 Magdeburg. (Year: 2019).*

(Continued)

*Primary Examiner* — Peter J Iannuzzi
(74) *Attorney, Agent, or Firm* — Osha Bergman Watanabe & Burton LLP

(57) ABSTRACT

One or more embodiments of the invention provides a system for extracting combinations of arbitrary numbers of media, included in a possessed medium group and having high frequencies of occurrence, in a game that proceeds as a user selects media from the possessed medium group and places the media in a game field, the individual media included in the possessed medium group being individually selected from a medium set preset in the game, the system including: a plurality of computing devices that each store possessed medium group information concerning possessed medium groups that are used by a plurality of predetermined users; and a control device that stores the possessed medium group information and that controls parallel processing of the operations of the individual computing devices, the control device allocating and sending sets constituted of a plurality of extracted media to the individual computing devices.

12 Claims, 8 Drawing Sheets

(56) References Cited

U.S. PATENT DOCUMENTS

2021/0001231 A1    1/2021    Kurabayashi
2022/0138244 A1*   5/2022    Kurabayashi ........... G06F 16/41
                                                                         707/741

OTHER PUBLICATIONS

S. D. Kamvar et al. "Interpreting and Extending Classical Agglomerative Clustering Algorithms using a Model-Based Approach" Department of Computer Science, Stanford University, Stanford, CA; 2002 (8 pages).
International Search Report issued in International Application No. PCT/JP2020/008725, mailed Mar. 24, 2020 (7 pages).
Written Opinion issued in International Application No. PCT/JP2020/008725; Dated Mar. 24, 2020 (5 pages).

* cited by examiner

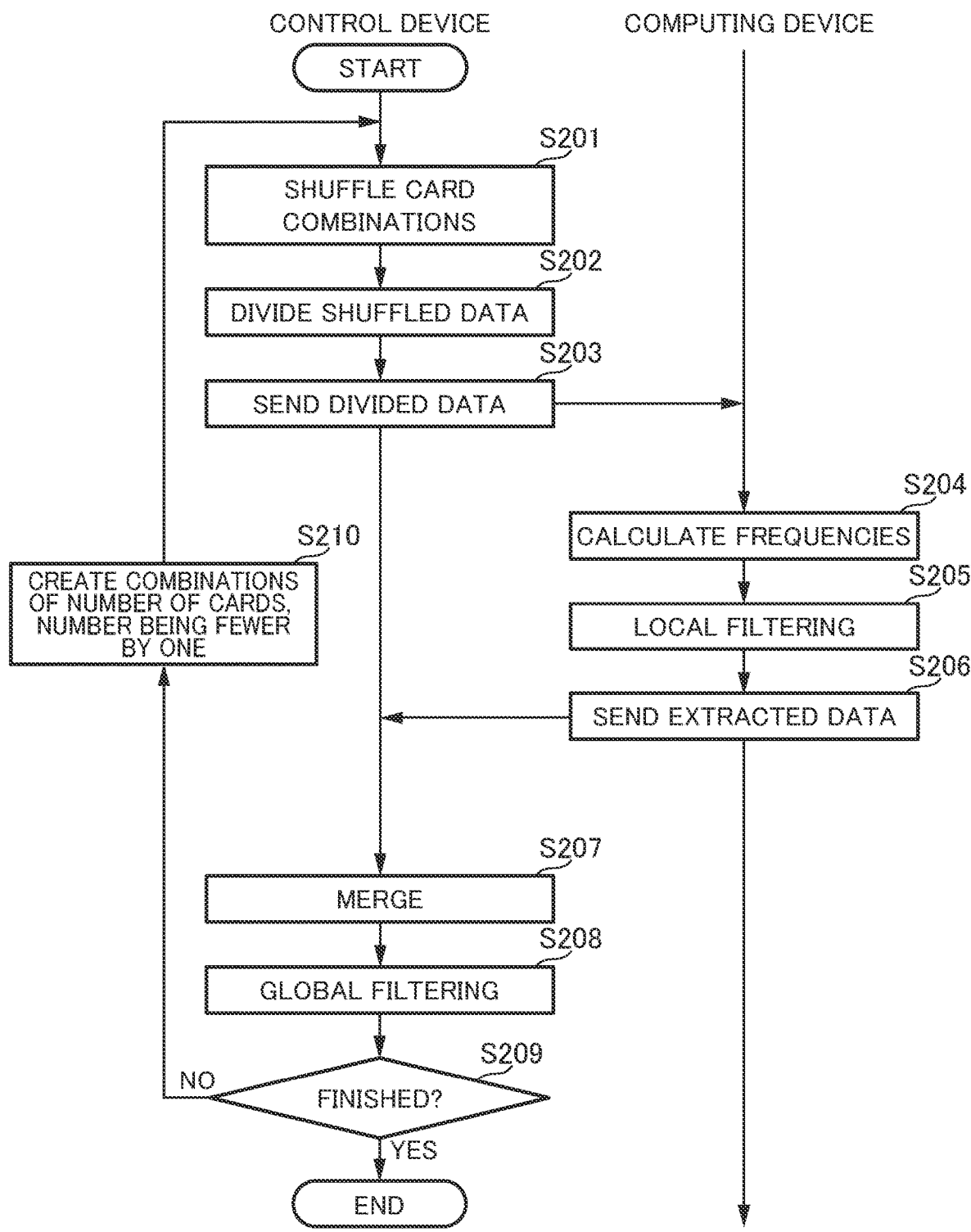

SYSTEM AND METHOD FOR EXTRACTING COMBINATIONS OF ARBITRARY NUMBERS OF MEDIA, INCLUDED IN POSSESSED MEDIUM GROUP AND HAVING HIGH FREQUENCIES OF OCCURRENCE

TECHNICAL FIELD

The present invention relates to a system and method for extracting combinations of arbitrary numbers of media, included in a possessed medium group and having high frequencies of occurrence, the possessed medium group being constructed to include N media, in a game that proceeds as a user selects media from the possessed medium group and places the media in a game field.

BACKGROUND ART

Recently, there is an increasing number of players who enjoy online games in which a plurality of players can participate via a network. Such a game is realized by a game system in which a portable terminal device or the like carries out communication with a server device or the like of a game administrator, which allows a player who operates the portable terminal device to play a battle against other players.

As a type of online game, there is a type of card game called digital collectible card games (DCCGs), in which various actions are executed in accordance with combinations of game media such as cards or characters. As the number of cards or the like in a game that is provided increases linearly, the strategic intricacies of the game improve drastically, while the number of combinations of cards or the like increases explosively.

CITATION LIST

Patent Literature

{PTL 1}
Publication of Japanese Patent No. 6438612

SUMMARY OF INVENTION

Technical Problem

It has not hitherto been possible to perform data processing for combining cards or the like, which results in a combinatorial explosion. A combinatorial explosion refers to the phenomenon in which, with N elements, since the number of combinations among the elements increases in proportion to 2N, the number of combinations increases astronomically with just a slight increase in N. For example, with an online card game in which a deck is constructed by selecting 40 cards from about 1,300 kinds of cards, it was not possible with existing computers to exhaustively analyze variations of 40-card decks that could be constructed.

With an online game that is provided continuously over several years, since the trends of users change in time, it is important to grasp the actual trends of users. In particular, in a genre of games in which game intricacies are ensured by card combinations, it is important to exhaustively grasp how cards are combined. If it becomes possible to extract combinatorial patterns of arbitrary numbers of cards, such as combinations of two cards, combinations of three cards, . . . and combinations of 39 cards, various applications will be possible. Thus, there is a need for such a technology.

As example applications, a wide range of applications are conceivable, including card combination tactics, auto-completion for card constructing operations, and QA processes such as the one disclosed in Patent Literature 1.

The present invention has been made in order to solve the problem described above, and it is a main object thereof to provide a system or the like that makes it possible to exhaustively extract combinations of arbitrary numbers of media in data processing that would result in a combinatorial explosion.

Solution to Problem

In order to achieve the above object, a system according to an aspect of the present invention is:

a system for extracting combinations of arbitrary numbers of media, included in a possessed medium group and having high frequencies of occurrence, the possessed medium group being constructed to include N media, in a game that proceeds as a user selects media from the possessed medium group and places the media in a game field, the individual media included in the possessed medium group being individually selected from a medium set from a medium set preset in the game, the system being characterized by including:

a plurality of computing devices that each store possessed medium group information concerning possessed medium groups that are used by a plurality of predetermined users; and a control device that stores the possessed medium group information and that controls parallel processing of the operations of the individual computing devices, the control device allocating and sending sets constituted of a plurality of extracted media to the individual computing devices, and the system being characterized in that:

each of the computing devices is configured to be able to calculate the individual frequencies of occurrence of the sets received from the control device by referring to the possessed medium group information, to extract sets having high frequencies of occurrence satisfying a first criterion, and to send the extracted sets to the control device, and the control device is configured to be able to merge the sets received from the individual computing devices, to cluster the merged sets into a plurality of clusters, and to extract sets having high frequencies of occurrence satisfying a second criterion for each of the clusters, and to be able to generate a plurality of new sets by individually joining media included in the medium set to each of the extracted sets and to allocate and send the generated sets to the individual computing devices.

Furthermore, in the present invention, preferably, the control device is configured to be able to allocate and send media included in the medium set to the individual computing devices before allocating and sending sets constituted of a plurality of media to the individual computing devices, each of the computing devices is configured to be able to calculate the frequencies of occurrence of the individual media received from the control device by referring to the possessed medium group information, to extract media having high frequencies of occurrence satisfying a predetermined criterion from the received media, and to send the extracted media to the control device, and the control device is configured to be able to merge the media received from the individual computing devices, to generate a plurality of sets constituted of two media by individually joining media included in the medium set to each of the merged media, and to allocate and send the generated sets to the individual computing devices.

Furthermore, in the present invention, preferably, the control device is configured to be able to extract a plurality of sets constituted of N media from the possessed medium group of a plurality of users included in the possessed medium group information and to allocate and send the extracted sets to the individual computing devices, each of the computing devices is configured to be able to calculate the individual frequencies of occurrence of the sets received from the control device by referring to the possessed medium group information, to extract media having high frequencies of occurrence satisfying the first criterion from the received sets, and to send the extracted media to the control device, and the control device is configured to be able to merge and output the sets received from the individual computing devices, and to be able to generate a plurality of new sets by individually excluding, from each of the merged sets, a single medium in the media constituting that merged set, and to allocate and send the generated sets to the individual computing devices, and each of the computing devices is configured to be able to calculate the individual frequencies of occurrence of the sets received from the control device by referring to the possessed medium group information, to extract sets having high frequencies of occurrence satisfying the first criterion, and to send the extracted sets to the control device, and the control device is configured to be able to merge the sets received from the individual computing devices, to cluster the merged sets into a plurality of clusters, and to extract sets having high frequencies of occurrence satisfying the second criterion for each of the clusters, and is configured to be able to generate a plurality of new sets by individually excluding, from each of the extracted sets, a single medium in the media constituting that extracted set, and to allocate and send the generated sets to the individual computing devices.

Furthermore, in the present invention, preferably, the control device is configured to shuffle the order of array of media or sets before allocating the media or sets to the individual computing devices.

Furthermore, in the present invention, preferably, the first criterion is that in the case where sets are selected in descending order of the frequencies of occurrence, sets are selected until the sum of the frequencies of occurrence of the selected sets reaches a predetermined ratio of the sum of the calculated frequencies of occurrence of the sets.

Furthermore, in the present invention, preferably, the control device merges the sets received from the individual computing devices while rearranging the sets in descending order of the frequencies of occurrence, and clusters the merged sets into a plurality of clusters by applying agglomerative hierarchical clustering.

Furthermore, in the present invention, preferably, when clustering the merged sets into a plurality of clusters, the control device sets adjacent sets in the merged sets as constituting one cluster in the case where the adjacent sets include not less than a predetermined number of common media.

Furthermore, in the present invention, preferably, the control device is configured to be able to calculate, in extracting sets of media having high frequencies of occurrence satisfying the second criterion, a cluster frequency ratio for each of the clusters from the sum of the frequencies of occurrence of the sets set in that cluster, and the second criterion is that in the case where sets are selected in descending order of the frequencies of occurrence, sets are selected until the sum of the frequencies of occurrence of the selected sets reaches a predetermined value based on the cluster frequency ratios.

Furthermore, in the present invention, preferably, the predetermined criterion is that in the case where media are selected in descending order of the frequencies of occurrence, media are selected until the sum of the frequencies of occurrence of the selected media reaches a predetermined ratio of the sum of the calculated frequencies of occurrence of the media.

Furthermore, in order to achieve the above object, a method according to an aspect of the present invention is:

a method for extracting combinations of arbitrary numbers of media, included in a possessed medium group and having high frequencies of occurrence, the possessed medium group being constructed to include N media, in a game that proceeds as a user selects media from the possessed medium group and places the media in a game field, the individual media included in the possessed medium group being individually selected from a medium set preset in the game, the method characterized by including:

a step, executed at a control device, of allocating and sending extracted media or sets constituted of a plurality of media to individual computing devices;

a step, executed at each of the computing devices, of calculating the individual frequencies of occurrence of the sets received from the control device by referring to possessed medium group information concerning possessed medium groups that are used by a plurality of predetermined users, extracting sets having high frequencies of occurrence satisfying a first criterion, and sending the extracted sets to the control device;

a step, executed at the control device, of merging the sets received from the individual computing devices, clustering the merged sets into a plurality of clusters, and extracting sets having high frequencies of occurrence satisfying a second criterion for each of the clusters; and a step of generating a plurality of new sets by individually joining media included in the medium set to each of the extracted sets, and allocating and sending the generated sets to the individual computing devices.

Furthermore, in order to achieve the above object, a system according to an aspect of the present invention is:

a system for extracting combinations of arbitrary numbers of media, included in a possessed medium group and having high frequencies of occurrence, the possessed medium group being constructed to include N media, in a game that proceeds as a user selects media from the possessed medium group and places the media in a game field, the individual media included in the possessed medium group being individually selected from a medium set preset in the game, the system being characterized by including:

a plurality of computing devices that each store possessed medium group information concerning possessed medium groups that are used by a plurality of predetermined users; and a control device that stores the possessed medium group information and that controls parallel processing of the operations of the individual computing devices, the control device allocating and sending sets constituted of a plurality of media to the individual computing devices, and the system being characterized in that:

each of the computing devices is configured to be able to calculate the individual frequencies of occurrence of the sets received from the control device by referring to the possessed medium group information, to extract sets having high frequencies of occurrence satisfying a first criterion, and to send the extracted sets to the control device, and the control device is configured to be able to merge the sets received from the individual computing devices, to cluster the merged sets into a plurality of clusters, and to extract sets having high frequencies of occurrence satisfying a second criterion for each of the clusters, and to be able to generate a plurality of new sets by individually excluding, from each of the extracted sets, a single medium in the media constituting that extracted set, and to allocate and send the generated sets to the individual computing devices.

Furthermore, in order to achieve the above object, a method according to an aspect of the present invention is:

a method for extracting combinations of arbitrary numbers of media, included in a possessed medium group and having high frequencies of occurrence, the possessed medium group being constructed to include N media, in a game that proceeds as a user selects media from the possessed medium group and places the media in a game field, the individual media included in the possessed medium group being individually selected from a medium set preset in the game, the method being characterized by including:

a step, executed at a control device, of allocating and sending sets constituted of a plurality of media to individual computing devices;

a step, executed at each of the computing devices, of calculating the individual frequencies of occurrence of the sets received from the control device by referring to possessed medium group information concerning possessed medium groups that are used by a plurality of predetermined users, extracting sets having high frequencies of occurrence satisfying a first criterion, and sending the extracted sets to the control device;

a step, executed at the control device, of merging the sets received from the individual computing devices, clustering the merged sets into a plurality of clusters, and extracting sets having high frequencies of occurrence satisfying a second criterion for each of the clusters; and a step of generating a plurality of new sets by individually excluding, from each of the extracted sets, a single medium in the media constituting that extracted set, and allocating and sending the generated sets to the individual computing devices.

Advantageous Effects of Invention

The present invention makes it possible to exhaustively extract combinations of arbitrary numbers of media in data processing that would result in a combinatorial explosion.

BRIEF DESCRIPTION OF DRAWINGS

FIG. 10 explains subtractive inference processing in a system that extracts combinations of k cards, where k is an arbitrary number.

DESCRIPTION OF EMBODIMENTS

Figure 1:
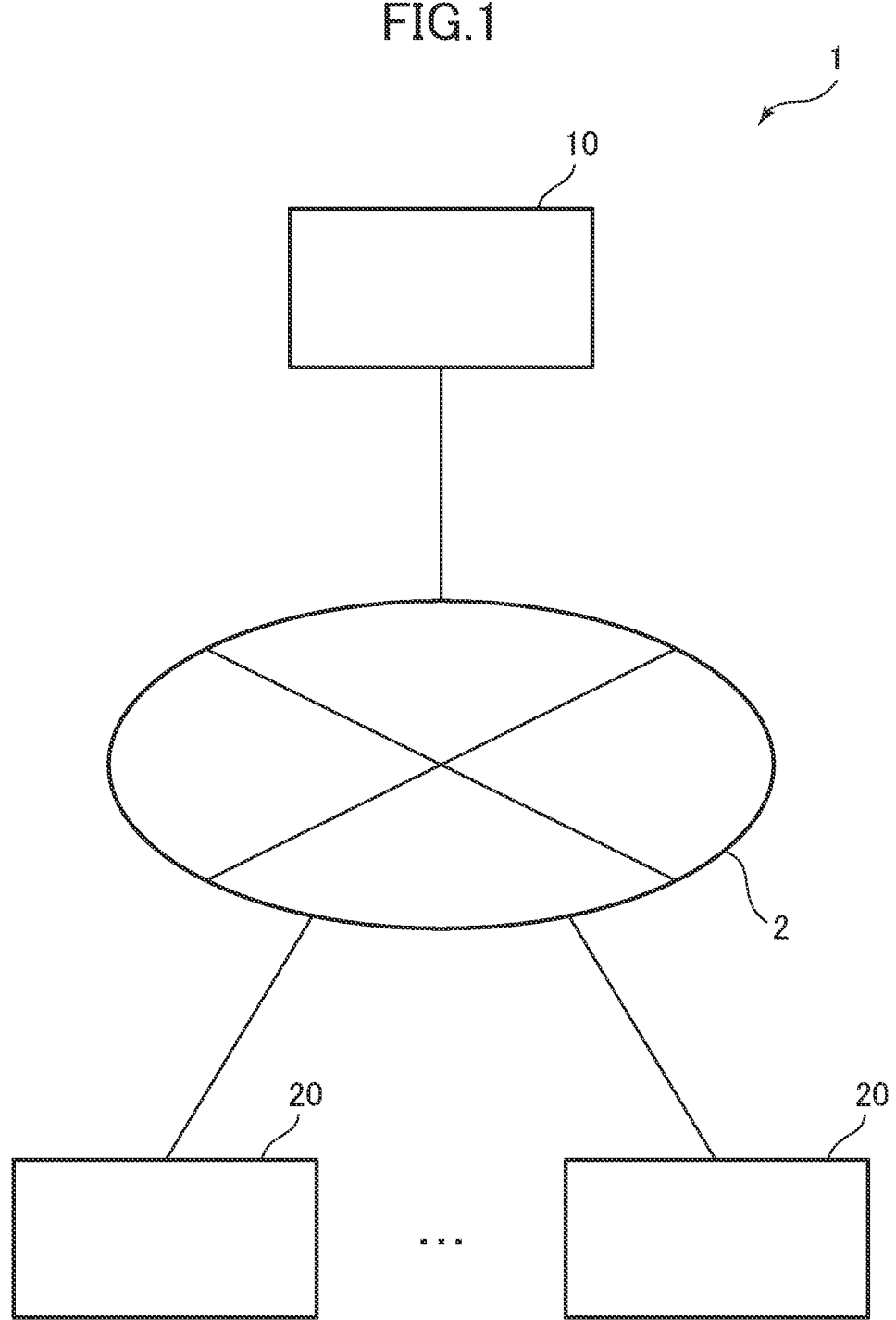
FIG. 1 is an overall configuration diagram of a system in one embodiment of the present invention.

A system 1 according to an embodiment of the present invention will be described below with reference to the drawings. FIG. 1 is an overall configuration diagram of the system 1 in one embodiment of the present invention. As shown in FIG. 1, the system 1 includes a control device 10 and a plurality of computing devices 20, which are connected to a network 2 so as to be able to communicate with each other. Preferably, the control device 10 controls the entire system 1.

Figure 2:
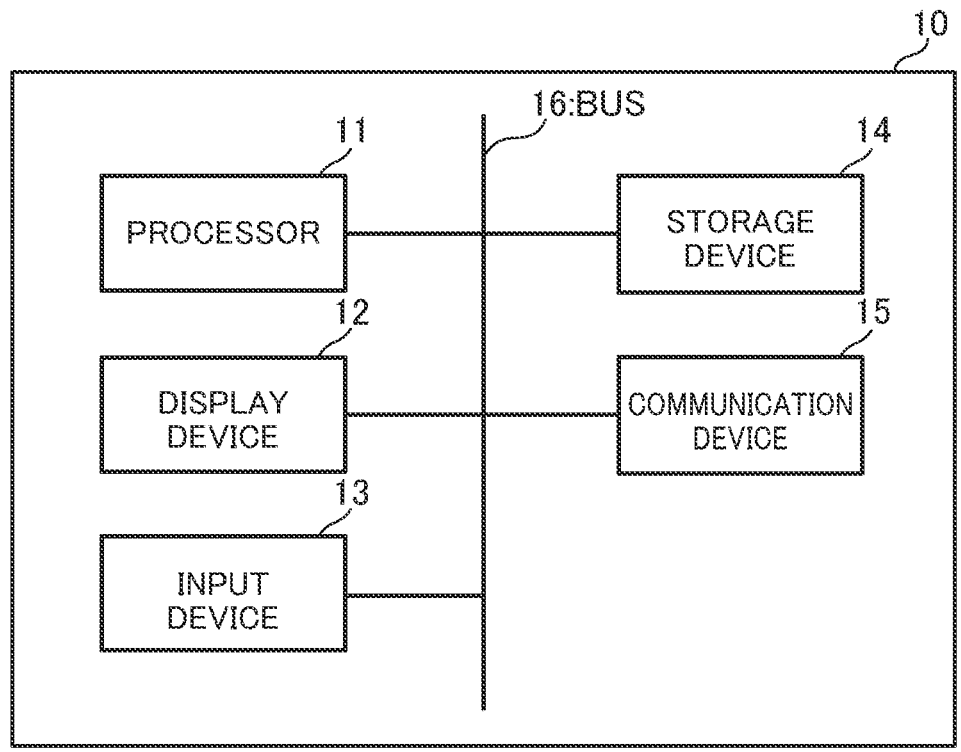
FIG. 2 is a block diagram showing the hardware configuration of a control device in one embodiment of the present invention.

FIG. 2 is a block diagram showing the hardware configuration of the control device 10 in one embodiment of the present invention. The control device 10 according to this embodiment includes a configuration similar to that of an ordinary server, PC, or the like. The control device 10 includes a processor 11, an output device 12, an input device 13, a storage device 14, and a communication device 15. These individual constituent devices are connected via a bus 16. Note that interfaces are interposed as needed between the bus 16 and the individual constituent devices.

The processor 11 controls the operation of the control device 10 as a whole; for example, the processor 11 is a CPU and a GPU. Since the control device 10 performs parallel processing, preferably, the processor 11 includes a GPU for performing general-purpose processing not including graphic rendering. With this configuration, it becomes possible to perform parallel processing by simultaneously running a plurality of cores, thereby increasing the computation speed. The processor 11 executes various kinds of processing by loading programs and data stored in the storage device 14 and executing the programs.

The input device 13 is a user interface that accepts inputs to the control device 10 from a user; for example, the input device 13 is a touchscreen, a touchpad, a keyboard, or a mouse. The output device 12 outputs or displays output information of the control device 10 to the user; for example, the output device 12 is a display or a printer that outputs an image.

The storage device 14 includes a main storage device and an auxiliary storage device. The main storage device is a semiconductor memory, such as a RAM. The RAM is a volatile storage medium that allows high-speed reading and writing of information and is used as a storage area and a work area when the processor 11 processes information. The main storage device may include a ROM, which is a read-only, non-volatile storage medium. In this case, the ROM stores programs such as firmware. The auxiliary storage device stores various programs as well as data used by the processor 11 when executing the individual programs. The auxiliary storage device is, for example, a hard disk device; however, the auxiliary storage device may be any type of non-volatile storage or non-volatile memory that is capable of storing information, which may be of the removable type. For example, the auxiliary storage device stores an operating system (OS), middleware, application programs, various kinds of data that may be referred to as these programs are executed, etc.

The communication device 15 sends data to and receives data from other computers via the network 2. For example, the communication device 15 connects to the network 2 by carrying out wired communication using an Ethernet (registered trademark) cable or the like or wireless communication such as mobile communication or wireless LAN communication.

Figure 3:
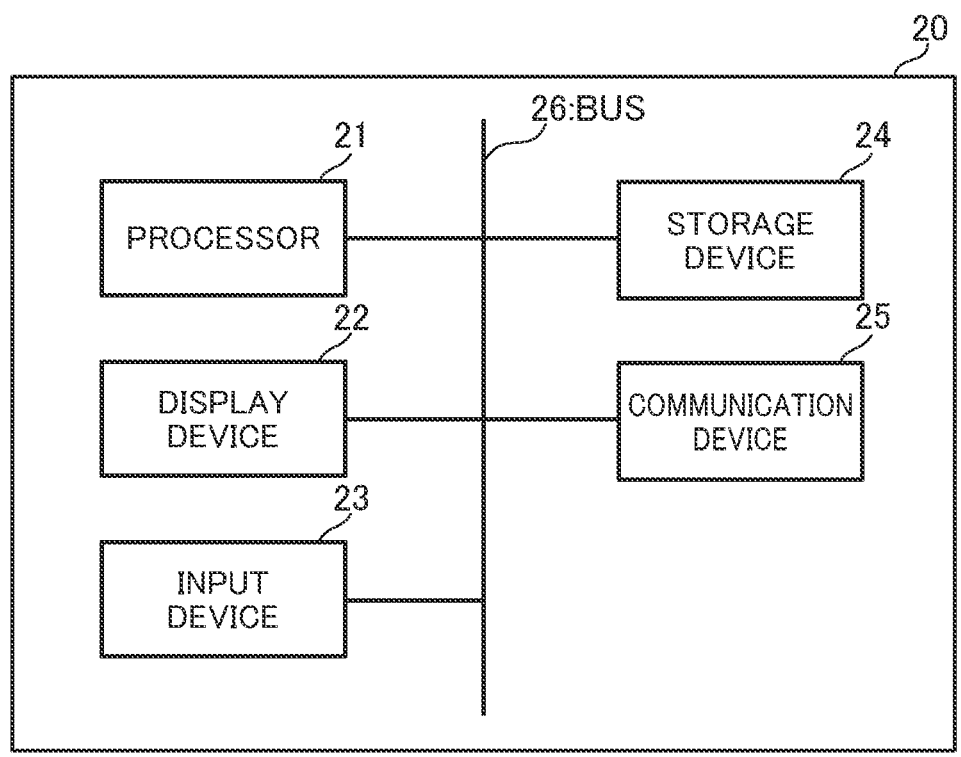
FIG. 3 is a block diagram showing the hardware configuration of a computing device in one embodiment of the present invention.

FIG. 3 is a block diagram showing the hardware configuration of the computing device 20 in one embodiment of the present invention. The computing device 20 according to this embodiment includes a configuration similar to that of an ordinary server, PC, or the like. The computing device 20 includes a processor 21, an output device 22, an input device 23, a storage device 24, and a communication device 25. These individual constituent devices are connected via a bus 26. Note that interfaces are interposed as needed between the bus 26 and the individual constituent devices. Each of the plurality of computing devices 20 includes this configuration.

The processor 21 controls the operation of the computing device 20 as a whole; for example, the processor 21 is a CPU and a GPU. Since the computing device 20 performs parallel processing, the processor 21 preferably includes a GPU for performing general-purpose processing not including graphic rendering. With this configuration, it becomes possible to perform parallel processing by simultaneously running the processing on a plurality of cores, thereby increasing the computation speed. The processor 21 executes various kinds of processing by loading programs and data stored in the storage device 24 and executing the programs.

The input device 23 is a user interface that accepts inputs to the computing device 20 from the user; for example, the input device 23 is a touchscreen, a touchpad, a keyboard, or a mouse. The output device 22 outputs or displays output information of the computing device 20 to the user; for example, the output device 22 is a display or a printer that outputs an image.

The storage device 24 includes a main storage device and an auxiliary storage device. The main storage device is a semiconductor memory, such as a RAM. The RAM is a volatile storage medium that allows high-speed reading and writing of information and is used as a storage area and a work area when the processor 21 processes information. The main storage device may include a ROM, which is a read-only, non-volatile storage medium. In this case, the ROM stores programs such as firmware. The auxiliary storage device stores various programs as well as data used by the processor 21 when executing the individual programs. The auxiliary storage device is, for example, a hard disk device; however, the auxiliary storage device may be any type of non-volatile storage or non-volatile memory that is capable of storing information, which may be of the removable type. For example, the auxiliary storage device stores an operating system (OS), middleware, application programs, various kinds of data that may be referred to as these programs are executed, etc.

The communication device 25 sends data to and receives data from other computers via the network 2. For example, the communication device 25 connects to the network 2 by carrying out wired communication using an Ethernet (registered trademark) cable or the like or wireless communication such as mobile communication or wireless LAN communication.

One of the technical features of the system 1 according to the embodiment of the present invention is that important combinations are extracted exhaustively from a large amount of accumulated logs of a card battle game by calculating the frequencies of occurrence of exhaustive combinations in the game logs. The game logs used by the system 1 are recorded by a game server (not shown). The game server includes a configuration similar to that of an ordinary server; for example, the game server is a known server computer.

The game server is connected to a terminal device (not shown) of each user who plays the game, via a network such as the Internet. The terminal device of the user is preferably a smartphone; however, the terminal device may be a personal computer, a tablet, a mobile phone, or the like. For example, when each user activates a game app installed in the terminal device, the terminal device accesses the game server, and the game server accepts access from each terminal device and provides a game service via the network. The game server stores a game program, which is a game application, executes the game in accordance with the input of game operations at the terminal device of the user, and sends the results of execution to the terminal device of the user. The game server stores and manages game logs including the content of operations performed by each user.

The game provided by the game server in this embodiment is what is called a digital collectible card game (DCCG). Specifically, the game in this embodiment proceeds while a user selects cards from a possessed card group constructed to include a plurality of cards and places those cards in a game field, whereby various events are executed in accordance with combinations of the cards or classes. The possessed card group is generally referred to as a card deck. Furthermore, the game in this embodiment is a battle game in which a plurality of users battle against each other by selecting cards from possessed card sets and placing those cards in a game field 43. For example, each card has card definition information including parameters such as a card ID, the kind of card, hit points, attacking power, and an attribute, and each class has class definition information. The kind of card is information indicating whether a card represents a character or an item.

The game server stores information related to the game for each user, such as cards possessed by that user, in association with a user ID. The game server allows a user to obtain a card by a predetermined method in the game. The user can obtain a plurality of cards from the preset kinds C of all the cards existing in the game. The cards that are obtained may include cards of the same kind. In one example, the game server performs lottery processing, such as gacha, in response to a user operation, thereby allowing the user to obtain a card. In one example, the game server stores an in-game currency associated with the user ID, and allows the user to obtain a desired card in response to a user operation performed by the user to obtain that card by consuming the in-game currency.

The game server lets the user construct a card deck by selecting N cards from a plurality of cards obtained and possessed by the user. A card deck constituted of N cards is constructed in this manner. In one example, when letting the user construct a card deck, the game server lets the user select N cards on the basis of a predetermined rule, for example, such that more than three cards of the same kind cannot be selected.

Figure 4:
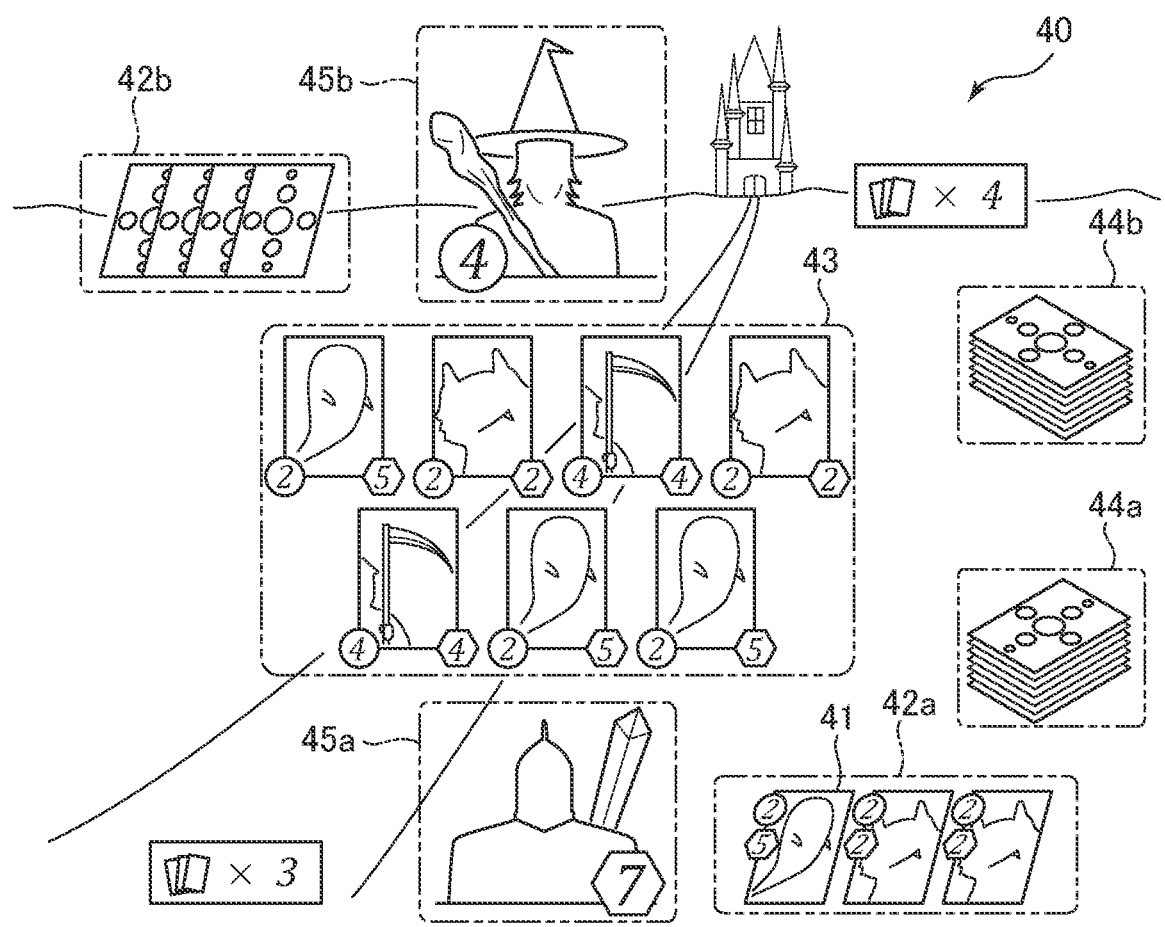
FIG. 4 shows an example game screen that is displayed on a display of a terminal device of a user.

FIG. 4 shows an example game screen that is displayed on the display of the terminal device of a user, which is a game screen 40 for a card battle between the local user, who is the user himself or herself operating the user terminal device, and another user operating another user terminal device. The game screen 40 shows a first card group 42a, which is the hand of the local user, and a first card group 42b, which is the hand of the other user. The game is configured so that the local user cannot check the content of the first card group 42b of the other user.

A possessed card group possessed by each user is constituted of a first card group 42, which is the hand of the user, and a second card group 44, which is the stock of the user. Whether each card 41 possessed by the user is included in the first card group 42 or the second card group 44 is determined in accordance with the proceeding of the game. The first card group 42 is a set of cards that can be selected by the user and placed in the game field 43, and the second card group 44 is a set of cards that cannot be selected by the user. Although the possessed card group is constituted of a plurality of cards 41, depending on the proceeding of the game, there are cases where the possessed card group is constituted of a single card 41. The game proceeds as the individual users place cards 41 in the game field 43 from the individual first card groups 42 (42a and 42b). The card deck of each user may be constituted of cards 41 of individually different kinds, or may partially include cards 41 of the same kind. Furthermore, the kinds of cards 41 constituting the card deck of the local user may be different from the kinds of cards 41 constituting the card deck of the other user. In another example, the possessed card group possessed by each user is constituted of only a first card group 42.

The game screen 40 shows a character 45a selected by the local user and a character 45b selected by the other user. In this embodiment, the character selected by the user is different from characters associated with cards, and defines a class indicating the type of the possessed card group. The game in this embodiment is configured such that the cards 41 possessed by users vary depending on classes. In one example, the game in this embodiment is configured such that the kinds of cards that may constitute the card decks of individual users vary depending on classes. In one example, the game in this embodiment is configured such that effects that occur when cards 41 are placed in the game field 43 vary depending on parameters set in the card definition information.

Note that the cards 41 are an example of media, and the possessed card group is an example of a possessed medium group constructed to include a plurality of media possessed by the user. The media may be characters, items, or the like. For example, a six-card set, i.e., a set constituted of six cards, can be expressed as a set constituted of six media. Furthermore, the kinds of all the cards preset in the game, i.e., the card set, can be expressed as the medium set. For example, in the case where the medium set is constituted of media including characters and items, the game screen 40 shows characters or items themselves as the cards 41.

In the game provided by the game server in this embodiment, a card deck is constituted of N cards selected from all the preset kinds C of cards existing in the game. In this embodiment, for convenience of description, it is assumed that N is 40 and C is 1,300; however, it will be understood that there is no limitation to these values. The game server stores game logs, and the system 1 uses the game logs. A game log includes a user ID, a class, and card deck information. The card deck information is information concerning the N cards constituting a card deck used by a user, which is preferably associated with a user ID. A game log need not include a class. In one example, the game server or the control device 10 stores each item of card deck information stored in game logs in association with at least one of the winning rate of the card deck, the usage rate of the card deck, and the number of user IDs associated with the card deck information.

The system 1 is configured to be able to extract combinations of arbitrary numbers of cards, included in a card deck configured to include N cards and having high frequencies of occurrence, in a game that proceeds as a user selects cards from the card deck and places those cards in a game field. Specifically, by using card deck information A at least including a portion of card deck information stored in game logs, the system 1 extracts combinations of arbitrary numbers of cards, included in the card deck of each user at the start of the game and having high frequencies of occurrence. In this embodiment, for convenience of description, there are cases where a combination of k (k is an integer greater than or equal to two) cards or a combinatorial pattern of k cards is simply referred to as a k-card set. Furthermore, there are cases where a plurality of k-card sets extracted or merged by the control device 10 or the computing device 20 is referred to as a plurality of kinds of k-card sets, as distinguished from a single k-card set. Furthermore, a k-card set having a high frequency of occurrence refers to a k-card set having a high frequency of occurrence in a card deck included in card deck information A. Therefore, the level of the frequency of occurrence of a k-card set is proportional to the number of k-card sets included in card decks include in card deck information A.

The storage device 14 of the control device 10 stores card deck information A. The storage device 14 also stores the kinds C of all the cards. The control device 10 controls parallel processing of the individual operations of the plurality of computing devices 20, allocating data to be processed individually by the plurality of computing devices 20 and causing the execution of the processing. Card deck information A is stored in the storage device 24 of each of the s computing devices 20. In one example, card deck information A is card deck information extracted from the card deck information stored in the game logs, on the basis of at least either the winning rates or the usage rates of card decks associated with the card deck information. For example, card deck information A is created by extracting card deck information having winning rates exceeding 50% from the card deck information stored in the game logs. In one example, card deck information A is card deck information extracted from the card deck information stored in the game logs, on the basis of the number of user IDs associated with the card deck information. In one example, card deck information A and the kinds C of all the cards are stored in a csv file. In one example, the game server or the control device 10 extracts and creates card deck information A.

Conventionally, in the case where a card deck is constructed by selecting 40 cards from 1,300 kinds of cards, it has been difficult to exhaustively extract k-card sets having high frequencies of occurrence, where k is an arbitrary number, such as combinations having high frequencies of occurrence and constituted of two cards, constituted of three cards, constituted of four cards, . . . , and constituted of 39 cards. In particular, it has been difficult to extract 10 to 30-card sets having high frequencies of occurrence. Meanwhile it is possible with relative ease to calculate single cards, two-card sets, 39-card sets, and 40-card sets having high frequencies of occurrence.

Figure 5:
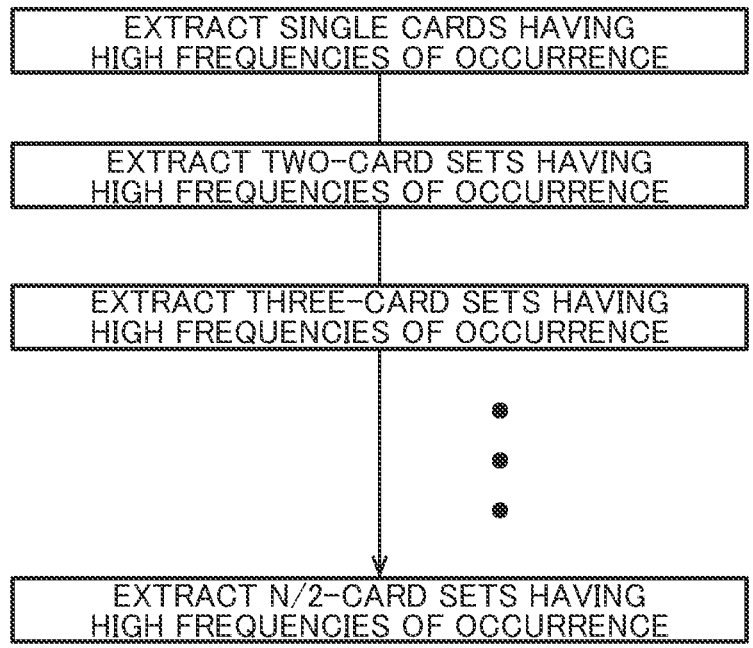
FIG. 5 shows an overview of inference processing that can be executed by the system.
Figure 6:
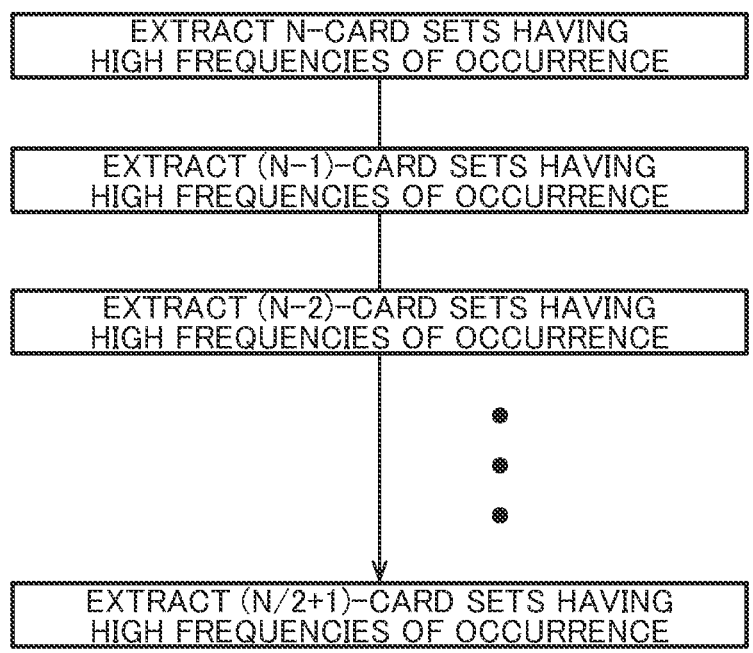
FIG. 6 shows an overview of inference processing that can be executed by the system.

FIGS. 5 and 6 show an overview of inference processing that can be executed by the system 1. The system 1 is configured to be able to execute additive inference processing shown in FIG. 5 and subtractive inference processing shown in FIG. 6. These kinds of processing are realized by the processors 11 and 21 of the control device 10 and each of the computing devices 20 individually executing programs. The additive inference processing refers to processing in which, for example, when it is known that two cards P and Q are combined at a high frequency, the order next to the two-card set, i.e., combinations of three cards, is obtained. When obtaining the next order, the system 1 calculates the frequencies of occurrence with reference to card deck information A, which is information concerning all the card decks used by users.

In the additive inference processing, the system 1 extracts single cards having high frequencies of occurrence, and extracts two-card sets having high frequencies of occurrence by using information of the extracted cards. Furthermore, the system 1 extracts three-card sets having high frequencies of occurrence by using information of the extracted two-card sets. In this manner, the system 1 extracts card combinations having high frequencies of occurrence among one-card sets to 20-card sets (N/2 cards).

In the subtractive inference processing, the system 1 extracts 40-card sets having high frequencies of occurrence, and extracts 39-card sets having high frequencies of occurrence by using information of the extracted 40-card sets. Furthermore, the system 1 extracts 38-card sets having high-frequencies of occurrence by using information of the extracted 39-card sets. In this manner, the system 1 extracts card combinations having high frequencies of occurrence among 40-card sets to 21-card sets (N/2+1).

Figure 7:
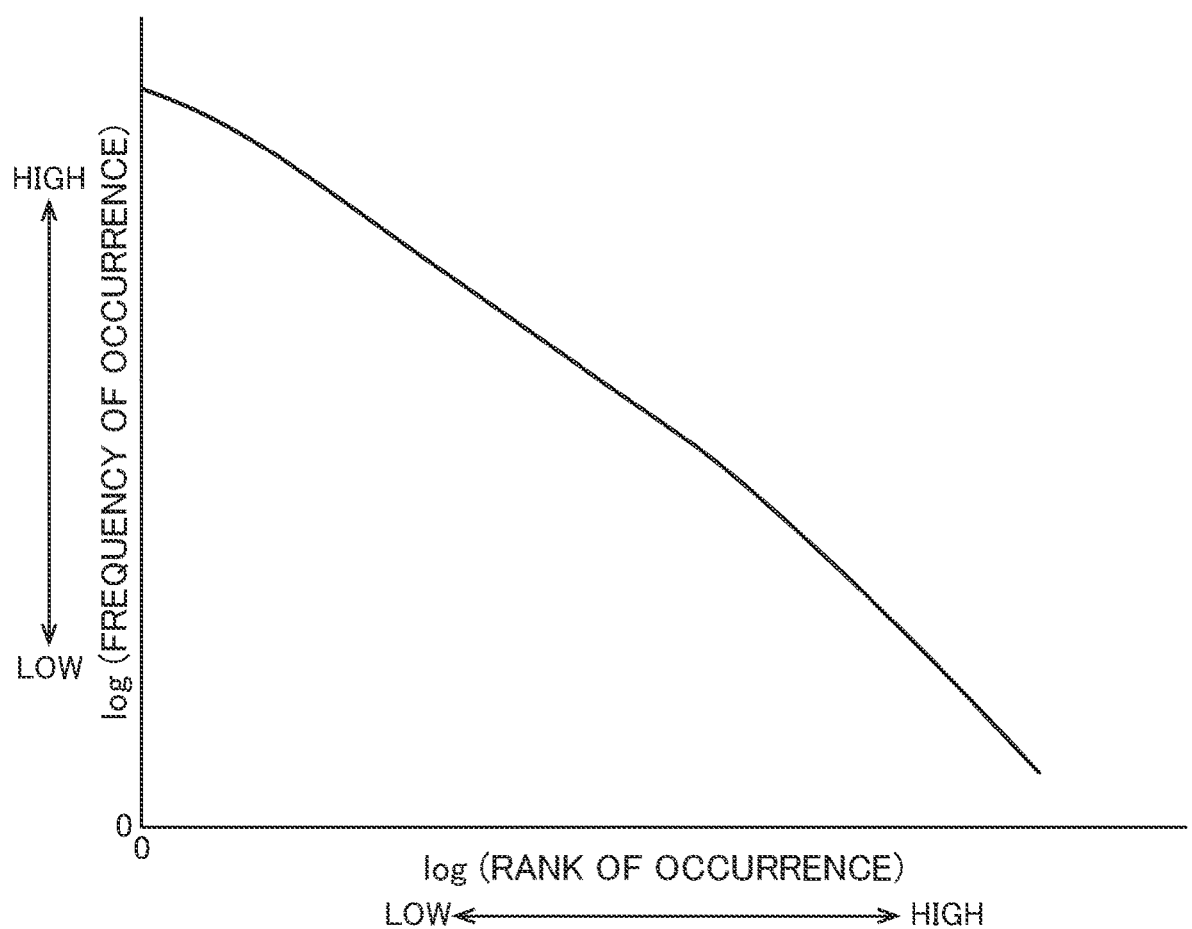
FIG. 7 shows the kinds of cards or card combinations per frequency of occurrence, confirmed by using card deck information A.

FIG. 7 shows the ranks of occurrence and the frequencies of occurrence of words in a language as a whole, which are generally observed. In FIG. 7, the horizontal axis is a logarithmic axis indicating the ranks of occurrence, and the vertical axis is a logarithmic axis indicating the frequencies of occurrence. FIG. 7 shows that a small number of specific words occupy most of the frequencies of occurrence, i.e., unevenness in frequency, called the Zipf structure, appears prominently. The system 1 in this embodiment presupposes that, in a card game, a small number of specific cards or card combinations occupy most of the frequencies of occurrence, i.e., high unevenness in frequency (Zipf structure) exists.

The system 1 in this embodiment realizes the extraction of exhaustive combinations by filtering card combination candidates stepwise and performing inference recursively, while suppressing combinatorial explosion by utilizing the Zipf structure of data. In the additive inference processing, in the case where the system 1 simply keeps only combinations having high frequencies through filtering, as the order of inference advances, the variety of elements constituting combinations becomes lost, and only combinations derived from specific combinations remain. As a result, the Zipf structure rapidly becomes lost and the frequency gradient disappears, and the filtering no longer functions effectively.

Thus, in the system 1 in this embodiment, global filtering is introduced to maintain the Zipf structure irrespective of the order.

In one example, the system 1 individually extracts 1 to 40-card sets having high frequencies of occurrence. In this case, the control device 10 and each of the computing devices 20 operate such that the system 1 extracts card combinations by performing the additive inference processing for 1 to 20-card sets and performing the subtractive inference processing for 21 to 40-card sets. In another example, when the input of 1 to 40 is accepted by the control device 10 via the input device 13, the system 1 extracts combinations of the accepted number of cards. For example, when the input of 15 is accepted by the control device 10 via the input device 13, the system 1 extracts 15-card sets having high frequencies of occurrence. In this case, the control device 10 and each of the computing devices 20 operate such that the system 1 extracts card combinations by performing only the additive inference processing.

Figure 8:
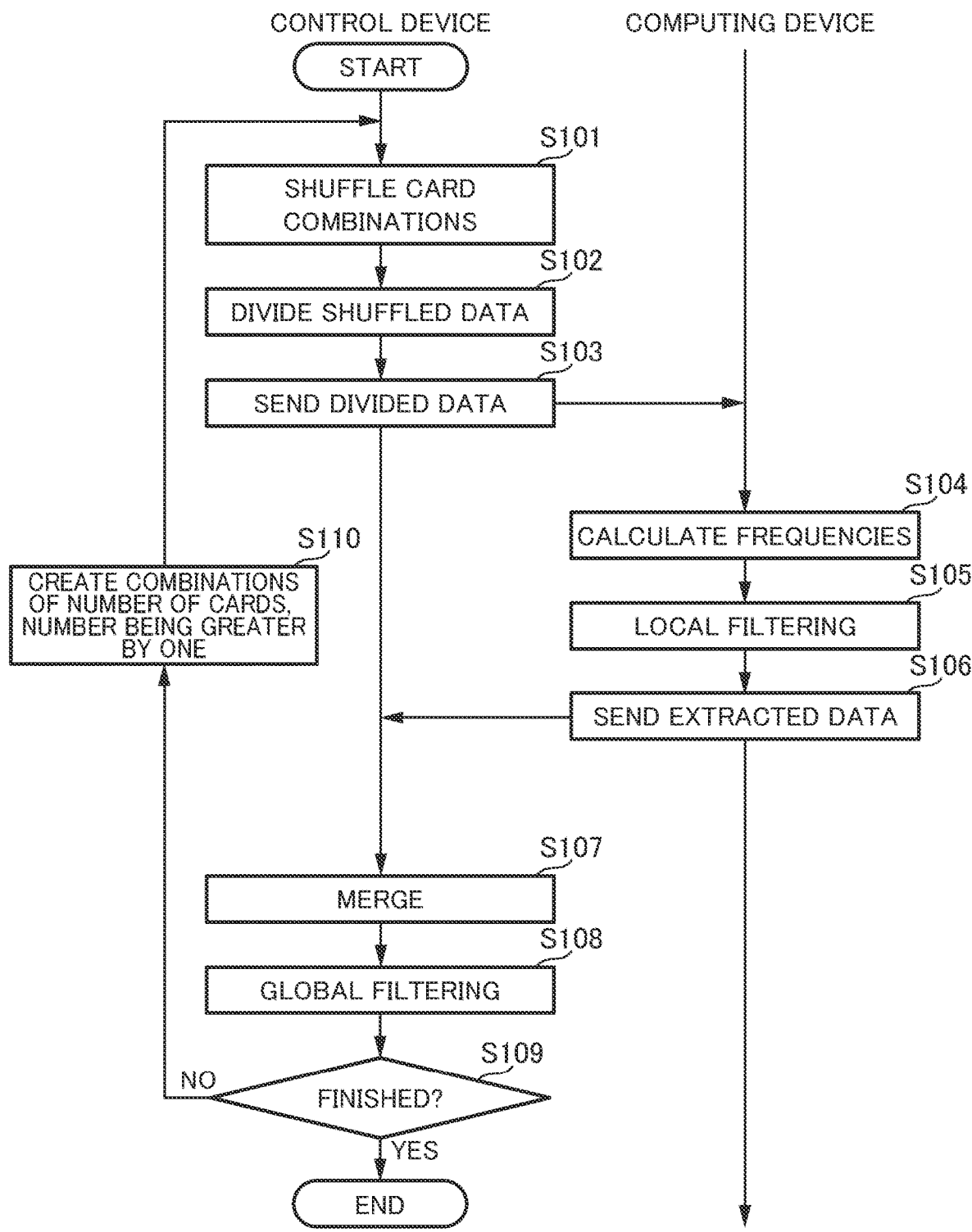
FIG. 8 explains additive inference processing in a system that extracts combinations of k cards, where k is an arbitrary number.

FIG. 8 explains the additive inference processing by the system 1 for extracting combinations of k cards, where k is an arbitrary number. The storage device 14 of the control device 10 stores data concerning $X_k$ kinds of k-card sets. The data is data in which data concerning $X_k$ kinds of k-card sets are arrayed one by one in order; for example, the data has the data structure of a one-dimensional array in which data concerning $X_k$ kinds of k-card sets are arrayed in order. Note that, although there are cases where it is described that cards or card combinations are sent or received in the present description for convenience of description, it will be understood that this refers to sending or receiving data concerning cards or card combinations.

The control device 10 shuffles the order of array of the $X_k$ kinds of k-card sets (step 101). The control device 10 divides the shuffled k-card sets into s (step 102), and allocates and sends the divided $X_k$/s kinds of card combinations to each of the s servers (step 103).

Each of the computing devices 20, upon receiving the $X_k$/s kinds of k-card sets from the control device 10, calculates the individual frequencies of occurrence of the received k-card sets by referring to card deck information A stored in the storage device 24 for the individual $X_k$/s kinds of k-card sets (step 104). Each of the computing devices 20 extracts k-card sets having high frequencies of occurrence satisfying a first criterion through local filtering processing (step 105) and sends the k-card sets to the control device 10 (step 106).

The control device 10 merges the plurality of kinds of k-card sets received from the individual computing devices 20 (step 107). The control device 10 performs global filtering processing to cluster the merged plurality of kinds of k-card sets into a plurality of clusters and to extract k-card sets having high frequencies of occurrence satisfying a second criterion for each of the clusters (step 108).

The control device 10 determines whether or not to extract combinations of a number of cards, the number being further greater by one (step 109). In the case where it is determined in step 109 that card combinations are not to be extracted, the additive inference processing is terminated. In the case where it is determined in step 109 that card combinations are to be extracted, the control device 10 generates (k+1)-card sets, which are combinations of a number of cards, the number being greater by one (step 110). Assuming that $X_k'$ kinds of k-card sets are extracted in step 108, the control device 10 individually joins all the kinds of cards included in the card set to each of the $X_k'$ kinds of k-card sets, thereby generating C kinds of (k+1)-card sets (step 110). Since the control device generates C kinds of (k+1)-card sets from one kind of k-card sets, as described above, the control device 10 generates ($X_k' \times C$) kinds ($X_{k+1}$ kinds) of (k+1)-card sets as a result. Then, the control device 10 can extract (k+1) card sets by executing steps 101 to 110.

Next, the local filtering processing will be described. The first criterion is that, in the case where k-card sets are selected in order from those having higher frequencies of occurrence, k-card sets are selected until the sum of the frequencies of occurrence of the selected k-card sets reaches a predetermined ratio of the sum of the frequencies of occurrence of the k-card sets, calculated by the computing devices 20 in step 104.

In one example, in step 104, each of the computing devices 20 calculates the numbers of the individual $X_k$'s kinds of k-card sets included in the card decks included in card deck information A, and rearranges the $X_k$'s kinds of k-card sets in descending order of the calculated numbers. In this case, for example, the computing device 20 stores the $X_k$'s kinds of k-card sets, rearranged in descending order of the calculated numbers, in the storage device 24 by using the data structure of a one-dimensional array. The numbers calculated for the individual k-card sets correspond to the individual frequencies of occurrence of the k-card sets in the card decks included in card deck information A. The computing device 20 calculates the sum $\alpha1$ of all the calculated numbers. The computing device 20, while selecting k-card sets in descending order of the calculated numbers, calculates the sum of the numbers for the selected k-card sets as $\alpha2$. Assuming that the predetermined ratio is T1 ($0 \le T1 \le 1$), k-card sets selected by the computing device 20 before $\alpha2$ reaches $\alpha1 \times T1$ serve as k-card sets satisfying the first criterion.

Preferably, in the local filtering processing, before performing extraction processing using the first criterion, each of the computing devices 20 extracts k-card sets by reflecting card-deck building rules in the game, thereby reducing the number of combinations. Examples of the extraction reflecting card-deck building rules include extraction in which combinations of cards that are not allowed in specific battles are excluded and extraction in which kinds of cards that cannot be contained depending on classes are excluded.

Next, the global filtering processing will be described. In step 107, the control device 10 merges the k-card sets received from the individual computing devices 20 by joining the k-card sets and sorting and arranging the results. In one preferred example, the control device 10 rearranges a plurality of kinds of k-card sets in descending order of the frequencies of occurrence. In this case, for example, the control device 10 stores the plurality of kinds of k-card sets, rearranged in descending order of the frequencies of occurrence, in the storage device 14 by using the data structure of a one-dimensional array.

In the clustering in step 108, the control device 10 clusters the merged plurality of kinds (Q kinds) of k-card sets into a plurality of kinds (P kinds) of clusters (subsets). Note that P<Q at this time. In one preferred example, as a clustering algorithm, the control device 10 uses agglomerative hierarchical clustering. As an algorithm for agglomerative hierarchical clustering, a known algorithm (e.g., Sepandar D. Kamvar, Dan Klein, and Christopher D. Manning. 2002. Interpreting and Extending Classical Agglomerative Clustering Algorithms using a Model-Based approach. In Proceedings of the Nineteenth International Conference on Machine Learning (ICML '02), Claude Sammut and Achim G. Hoffmann (Eds.). Morgan Kaufmann Publishers Inc., San Francisco, CA, USA, 283-290.) is used. In the case where this agglomerative hierarchical clustering is used, the control device 10 starts clustering with an array of k-card sets sorted in descending order of frequency, from the state in which the individual k-card sets located adjacent to each other in the array constitute individual clusters. The control device 10 sequentially combines clusters when a plurality of adjacent k-card sets include not less than a predetermined number of or a predetermined ratio of common cards in accordance with the clustering level, thereby generating cluster layers. The control device 10 repeats recursively applying this processing until the number of clusters becomes a predetermined number T or until any cluster group including not less than the predetermined ratio of common cards no longer exists. The control device 10 divides the plurality of kinds of k-card sets merged in step 108 into a plurality of clusters by using clusters in a layer in which the clustering algorithm has been terminated or in a predetermined layer.

In step 108, for each of the clusters, the control device 10 calculates the sum of the frequencies of occurrence of the plurality of kinds of k-card sets set in that cluster. The control device 10 calculates a cluster frequency ratio for each of the clusters by using the calculated sum of the frequencies of occurrence. The second criterion is that, when k-card sets are selected in descending order of the frequency of occurrence, k-card sets are selected until the sum of the frequencies of occurrence of the selected k-card sets reaches a predetermined value based on the cluster frequency ratios.

Figure 9:
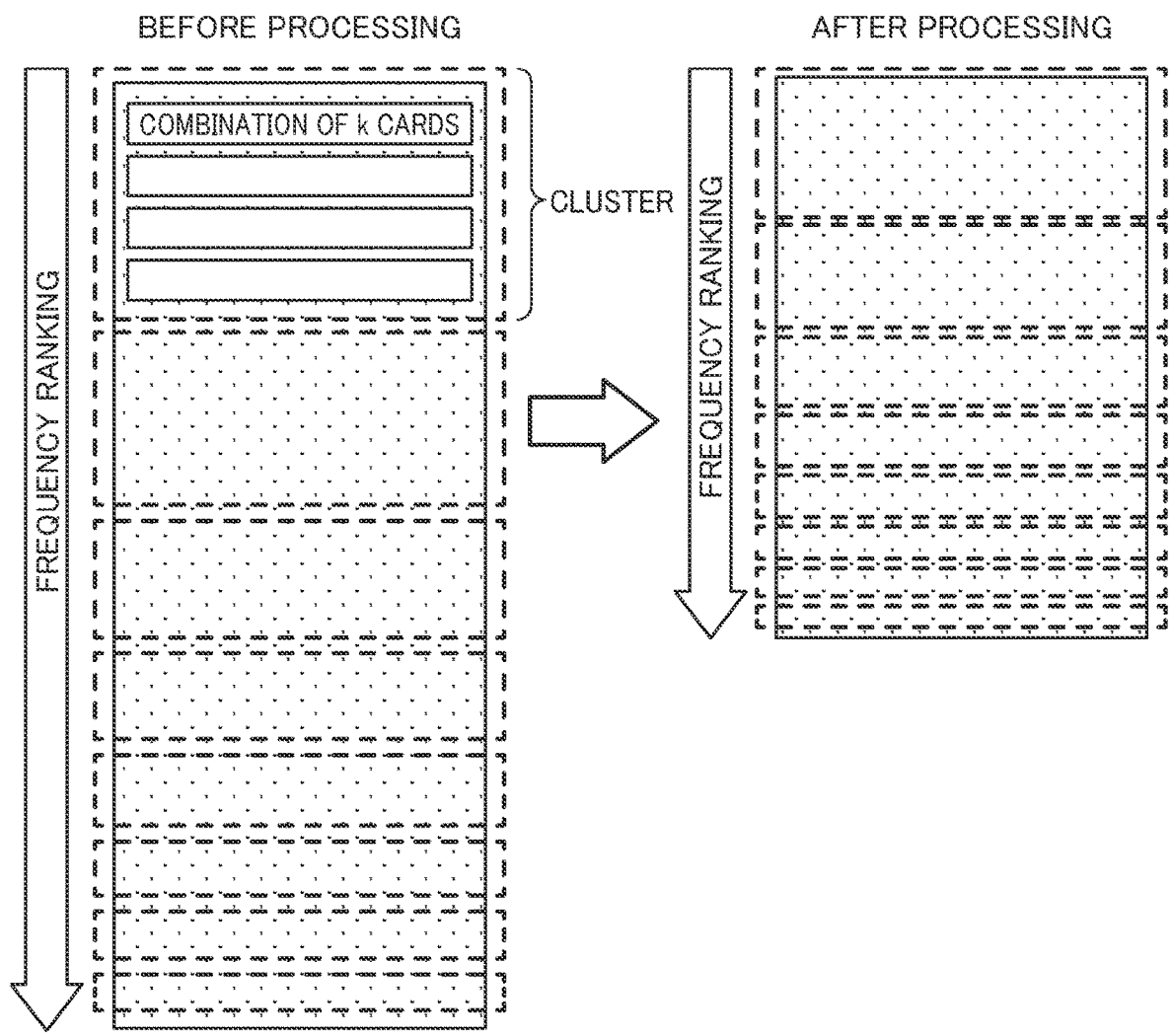
FIG. 9 explains global filtering processing.

FIG. 9 explains the global filtering processing. The left figure in FIG. 9 shows a state in which a plurality of kinds of k-card sets before the global filtering processing have been arranged in descending order of the frequency of occurrence and have been clustered into a plurality of clusters. The right figure in FIG. 9 shows a state in which a plurality of kinds of k-card sets after the global filtering processing have been arranged in descending order of the frequency of occurrence, while still having been clustered into the plurality of clusters. Preferably, a plurality of k-card sets are set in one cluster; however, only one k-card set may be set in one cluster. A plurality of k-card sets set in the same cluster include not less than a predetermined number of common cards.

In one example, the control device 10 calculates the sum $\beta1$ of all the frequencies of occurrence of the plurality of kinds of k-card sets before the global filtering processing. The control device 10 sets M individual clusters in a distinguishable manner, such as $CL_1, CL_2, \ldots CL_M$. The control device 10 calculates, for the individual clusters, the sums $\gamma_1, \gamma_2, \ldots \gamma_M$ of the frequencies of occurrence of the k-card sets set in those clusters. For example, the control device 10 calculates cluster frequency ratios, which are ratios of the individual clusters, from the sums $\gamma_1, \gamma_2, \ldots \gamma_M$ for the individual clusters to the total sum $\beta1$ ($=\gamma_1+\gamma_2 \ldots \gamma_M$). The control device 10 presets T2 as the target number of card combinations after the global filtering processing, and sets the product of T2 and the cluster frequency ratio of each cluster as an upper limit of the frequencies of occurrence of the k-card sets in that cluster. For cluster $CL_1$, while selecting k-card sets in descending order of the frequency of occurrence, the control device 10 calculates the sum of the frequencies of the selected k-card sets as $\delta_1$. Assuming that the upper limit of the frequencies of occurrence of the k-card sets set in cluster $CL_1$ is $UL_1$, k-card sets selected by the control device 10 before $\delta_1=UL_1$ is satisfied serve as k-card sets satisfying the second criterion.

In this embodiment, the system 1 (the control device 10) determines thresholds T1 and T2 for filtering processing by using the result of the immediately preceding inference processing, i.e., the result of extraction of (k−1)-card sets in the additive inference processing. Therefore, the thresholds T1 and T2 for the first criterion and the second criterion vary depending on the value of k, i.e., the number of cards that are combined. The system 1 (the control device 10) can maintain exhaustiveness in relation to the total number by utilizing high unevenness among the frequencies of individual combinations in the Zipf structure, while considerably reducing the number of card combinations.

Next, the first processing in the additive inference processing will be described. As described earlier, in the first processing in the additive inference processing, the system 1 extracts single cards having high frequencies of occurrence.

The control device 10 shuffles the order of array of C kinds ($X_1$ kinds) of single cards (step 101). The control device 10 divides the shuffled single cards into s (step 102), and allocates and sends C/s kinds of divided cards to each of the s servers (step 103).

Each of the computing devices 20, upon receiving the C/s kinds of cards from the control device 10, calculates the individual frequencies of occurrence of the received cards by referring to card deck information A stored in the storage device 24 for these individual cards (step 104). Each of the computing devices 20 extracts cards having high frequencies of occurrence satisfying a predetermined criterion through the local filtering processing (step 105), and sends the extracted cards to the control device 10 (step 106).

The control device 10 merges the plurality of cards received from the individual computing devices 20 (step 107). The control device 10 skips steps 108 and 109 and generates two-card sets, which are combinations of a certain number of cards, the number being greater by one (step 110). Assuming that $X_1$ kinds of cards are merged in step 107, the control device 10 individually joins all the kinds of cards included in the card set to each of the $X_1$ kinds of cards, thereby generating C two-card sets (step 110). Since the control device generates C kinds of two-card sets from a single card in this manner, the control device 10 generates ($X_1 \times C$) kinds ($X_2$ kinds) of two-card sets as a result. Note that the control device 10 may be configured to execute step 108 by adjusting the threshold T2 for the filtering processing.

Then, the control device 10 can extract k-card sets, where k is an arbitrary number, by repeatedly executing steps 101 to 110.

The predetermined criterion, which is similar to the first criterion, is that in the case where cards are selected in descending order of the frequency of occurrence, cards are selected until the sum of the frequencies of occurrence of the selected cards reaches a predetermined ratio of the sum of the frequencies of occurrence of cards, calculated by the computing devices 20 in step 104.

FIG. 10 explains the subtractive inference processing by the system 1 for extracting combinations of k cards, where k is an arbitrary number.

The control device 10 shuffles the order of array of $X_k$ kinds of k-card sets (step 201). The control device 10 divides the shuffled k-card sets into s (step 202), and allocates and sends the $X_k$/s kinds of divided card combinations to each of the s servers (step 203).

Each of the computing devices 20, upon receiving the $X_k$/s kinds of k-card sets from the control device 10, calculates the individual frequencies of occurrence of the received k-card sets by referring to card deck information A stored in the storage device 24 for the individual $X_k$/s kinds of k-card sets (step 204). Each of the computing devices 20 extracts k-card sets having high frequencies of occurrence satisfying the first criterion through the local filtering processing (step 205) and sends the extracted k-card sets to the control device 10 (step 206).

The control device 10 merges the plurality of kinds of k-card sets received from the individual computing devices 20 (step 207). The control device 10 performs the global filtering processing to cluster the merged plurality of kinds of k-card sets into a plurality of clusters and to extract card combinations having high frequencies of occurrence satisfying the second criterion for each of the clusters (step 208).

The control device 10 determines whether or not to extract combinations of a certain number of cards, the number being further fewer by one (step 209). In the case where it is determined in step 209 that card combinations are not to be extracted, the subtractive inference processing is terminated. In the case where it is determined in step 209 that card combinations are to be extracted, the control device 10 generates (k−1)-card sets, which are combinations of a certain number of cards, the number being fewer by one (step 210). Assuming that $X_k'$ kinds of k-card sets are merged in step 208, the control device 10 individually excludes single cards constituting the $X_k'$ kinds of k-card sets from the k-card sets, thereby generating new k kinds of (k−1)-card sets. Since the control device 10 generates k kinds of (k−1)-card sets from one kind of k-card sets, as described above, the control device 10 generates ($X_k' \times k$) kinds ($X_{k-1}$ kinds) of (k−1)-card sets as a result.

The local filtering processing and the global filtering processing are similar to those in the case of the additive inference processing. Note that also in the subtractive inference processing, similarly to the case of the additive inference processing, the system 1 (the control device 10) determines thresholds T1 and T2 for the filtering processing at the time of extracting k-card sets by using the result at the time of extracting (k+1)-card sets. Therefore, the thresholds T1 and T2 for the first criterion and the second criterion vary depending on the value of k, i.e., the number of cards that are combined.

Next, the first processing in the subtractive inference processing will be described. As described earlier, in the first processing in the subtractive inference processing, the system 1 extracts 39-card sets from 40-card sets.

The control device 10 shuffles the order of array of 40-card sets for the number of users included in card deck information A (step 201). The control device 10 divides the shuffled 40-card sets into s (step 202), and allocates and sends the divided $X_{40}$/s kinds of card combinations to each of the s servers (step 203).

Each of the computing devices 20, upon receiving the $X_{40}$/s kinds of 40-card sets from the control device 10, calculates the individual frequencies of occurrence of the received 40-card sets by referring to card deck information A stored in the storage device 24 for the individual $X_{40}$/s kinds of 40-card sets (step 204). Each of the computing devices 20 extracts k-card sets having high frequencies of occurrence satisfying the first criterion through the local filtering processing (step 205), and sends the extracted k-card sets to the control device 10 (step 206). However, each of the computing devices 20 may skip step 205.

The control device 10 merges the plurality of kinds of 40-card sets received from the individual computing devices 20 (step 207). The control device 10 skips steps 208 and 209, and the control device 10 generates 39-card sets, which are combinations of a number of cards, the number being fewer by one (step 210). Assuming that $X_{40}'$ kinds of 40-card sets are merged in step 207, the control device 10 individually excludes single cards constituting the 40-card set from each of $X_{40}'$ kinds of 40-card sets, thereby generating new 40 kinds of 39-card sets. Since the control device 10 generates 40 kinds of 39-card sets from one kind of 40-card set in this manner, the control device 10 generates ($X_{40}'\times 40$) kinds ($X_{39}$ kinds) of 39-card sets as a result. Note that the control device 10 may be configured to execute step 208 by adjusting the threshold T2 for the filtering processing.

Then, the control device 10 can extract k-card sets, where k is an arbitrary number, by repeatedly executing steps 201 to 210.

Next, the first processing in the additive inference processing will be described by using nine primitive functions that serve as basic functions constituting inference processing, namely, shuffle( ), divide( ), allocate( ), freq( ), join( ), projection( ), localfilter( ), globalfilter( ), and merge( ).

The shuffle processing for the analysis of single cards in step 101 is expressed as shuffle(C) by using the entire set of cards C existing in the game, and a rearranged set $C_1$ is obtained. The division processing in step 102 is expressed as divide($C_1$), and s subsets $[c_1, c_2, \ldots, c_s]$ are obtained. The allocation processing in step 103 is expressed as allocate ($[c_1, x_2, \ldots, c_s]$).

The frequency calculation processing in step 104 is expressed as freq(A, $c_i$) by using the subset $c_i$ for the i-th computing device 20 and the set A of all the decks used by users, and $D_{1,i}$ is calculated. Here, $D_{j,i}$ is calculated according to the following formula. j signifies the order in the inference processing, and $f_n$ signifies the frequency of occurrence of the n-th key.

$$D_{j,i} = \begin{bmatrix} [c_1, \ldots, c_j], & f_1 \\ \vdots, & \vdots \\ [c_1, \ldots, c_j] & f_n \end{bmatrix}$$

Therefore, $D_{1,i}$ is calculated according to the following formula.

$$D_{1,i} = \begin{bmatrix} [c_1], & f_1 \\ \vdots, & \vdots \\ [c_n] & f_n \end{bmatrix}$$

The local filtering processing in step 105 is expressed as localfilter($D_{1,i}$, $t_1$) by using a filter threshold $t_1$, and the result of processing $D_{1,i}'$ is obtained. The merge processing in step 107 is expressed as merge($D_{1,1}, D_{1,2}, \ldots, D_{1,s}$), and $D_1$ joined while being sorted in order of frequency is obtained. The global filtering processing in step 108 is expressed as globalfilter($D_1$, $t_2$) by using a filter threshold $t_2$, and the result of processing $D_1'$ is obtained. This is the result of the first processing in the additive inference processing.

The card generation processing for the analysis of two-card sets in step 110 is expressed as join(projection($D_1'$), C) by using projection($D_1'$), which is obtained by extracting only the key portions of $D_1'$, and the set C of all the cards, and a new card set C2 is obtained.

Next, the main operations and advantages of the system 1 according to the embodiment of the present invention will be described. The system 1 is configured to be able to execute the additive inference processing and the subtractive inference processing. In each of these kinds of inference processing, in the case where combinatorial patterns of k-card sets are extracted, each of the computing devices 20 performs the local filtering processing to extract combinations with which the sum of the frequencies thereof satisfies a predetermined ratio T1 to the total frequencies of occurrence, thereby reducing the overall number of combination candidates. The control device 10 performs the global filtering processing to set, by using the frequency information calculated by all the computing devices 20, an upper limit to the total frequency in each cluster by calculating the product of the sum of the frequencies of all card combinations in that cluster and the cluster frequency ratio. In the global filtering processing, combinations that satisfy a target T2 for the number of card combinations after the processing are extracted, thereby reducing the overall number of combination candidates. With such a configuration in which card combinations having relatively low frequencies in each cluster are excluded, it becomes possible to keep the number of card combination patterns within a certain number while maintaining the tendencies of the original set in terms of global variations, thereby suppressing combinatorial explosion.

In this embodiment, the system 1 determines thresholds T1 and T2 for the filtering processing by using the result of the immediately preceding inference processing, i.e., the result at the time of extracting (k-1)-card sets in the additive inference processing. The system 1 can maintain exhaustiveness in relation to the total number, while considerably reducing the number of card combinations, by utilizing high unevenness in the frequencies of individual combinations having the Zipf structure. The applicant verified with a real game that certain specific combinations occupied most of the frequencies of occurrence and that it sufficed to analyze such a very small number of combinations having high frequencies of occurrence from the viewpoint of extracting combinations. Furthermore, with the additive inference processing, mathematically, there is a property that the frequencies of combinations of a higher order does not exceed the frequencies of combinations of a lower order, the latter combinations being contained in the former combinations. Therefore, it will be understood that important combinations will not be discarded through such progressive filtering.

Furthermore, in this embodiment, it is possible to dictate the extraction for one order, for example, the extraction of six-card sets, in the form of stream processing. Thus, it is possible to readily implement the processing in the form of in-memory parallel processing using the plurality of computing devices 20, without having to store intermediate files, etc. in the storage devices. Furthermore, in this embodiment, since a huge number of candidates would have to be processed by a single node (the control device 10) with the global filtering processing alone, the system 1 extracts card combinations in a two-phase scheme including the local filtering processing. Thus, the amount of data subject to calculation is statistically moderated, which makes it possible to realize high scalability. Furthermore, by performing the global filtering processing, it becomes possible to realize high scalability even in the case where the order of combinations is increased.

With the above-described configuration of the system 1, it becomes possible to exhaustively analyze the problem of combinatorial explosion, which has not hitherto been considered to be possible. With conventional deck analysis, since the main analysis method has been manual analysis based on a small number of samples or statistical processing by data scientists based on data having a medium scale size, it has been difficult to exhaustively analyze data of hundreds of thousands of users. The applicant confirmed, with card decks constructed by combining 40 cards from among 1,300 kinds of cards, that it was possible to analyze card decks of about 300,000 users in about eight hours by using ten computing devices 20 having 72 cores as the processors 21. As described above, by further performing the local filtering and global filtering processing by using the control device 10 and the plurality of computing devices 20, it becomes possible to execute the additive and subtractive inference processing in practical time even in a situation where a combinatorial explosion occurs.

Furthermore, by using card deck information with high winning rates or card deck information of high-level users as card deck information A stored in the storage device 14 and the storage devices 24, it becomes possible for the system 1 to extract k-card sets, where k is an arbitrary number, having high frequencies of occurrence in decks with high winning rates or decks of high-level users. In this manner, it becomes possible to learn deck building with high winning rates or deck-building know-how acquired by high-level users.

Conceivable example applications of the system 1 include QA utilizing card combinations, information recommendation during card deck building, and play video recommendation, as follows.

In order to conduct QA utilizing card combinations, it is necessary to create decks including card combinations that seem likely to be constructed by real human users. However, conventionally, in the case where decks are generated at random, it has been necessary to verify a huge number of decks. It becomes possible to conduct efficient QA by preferentially using card combinations having high frequencies of occurrence by using the system 1 in this embodiment.

In order to automatically generate decks that seem likely to be constructed by human users but that have not actually been used, it is necessary to grasp how cards are combined with each other and to replace partial combinations having not so high combinatorial frequencies with other cards. For example, it becomes possible to automatically generate natural decks by replacing combinations having frequencies of occurrence falling within the lowest 5% with other card combinations among combinations having a lower order (e.g., eight-card sets), contained in decks having a high order (e.g., 40-card sets). If it is found out that the cards have not been used by any human user, it is meaningful to adopt the decks as subjects of debugging.

In one example, a deck generating device determines at high speed whether or not a deck has already been used by the bit-array comparing method described below and automatically generate decks efficiently and naturally while changing card combinations. Since the total number of cards is 2,000 at most, it is possible to express a single deck in the form of a bit array consisting of 2,000 bits, i.e., int[100] suffices to express a single deck. Since there is considerable unevenness in the patterns of the occurrence of decks, it is expected that the number of patterns will not increase beyond about one million even if ten million users continue to freely construct decks. Therefore, the data array size of the deck occurrence pattern will be int[100] (400 bytes)×1,000,000=about 381 megabytes, which is a size that can readily be stored in a memory. Furthermore, since it is possible with the Intel SIMD instruction AVX512 to calculate the AND of two bit arrays having a length of 256 bits at once, the deck generating device can check whether or not a deck has occurred with about ten CPU cycles at most. It becomes possible for the deck generating device to extract decks that have never been used before at extremely high speed by terminating the comparison processing in the case where a deck has occurred. Note that although the deck generating device is configured of one or more computers, the control device 10 may be caused to function as the deck generating device.

Furthermore, it has hitherto been difficult to recommend cards during card deck building. For example, in the case where the total number of cards is not less than 1,000, it is extremely difficult for users to grasp all the cards. In one example, for a user having a specific combination of cards, a deck recommending device recommends that generating other cards will yield a strong combination of cards. For example, for a user who possesses only a portion of cards constituting a card combination frequently used by other users, the deck recommending device can recommend, in a card generating screen or the like, one or more cards not included in the portion constituting the card combination. This makes it possible for the user to know which cards are to be generated in order to proceed with the game more advantageously, in a seamless manner in the game. Note that although the deck recommending device is configured of one or more computers, a game server may be caused to function as the deck recommending device.

Furthermore, it has hitherto been difficult for novice users of card games to devise combinations of cards even if they understand the individual roles of the cards. A play-video recommending device recommends a play video telling how to utilize cards to a user who possess those cards. The play video may be a play log by the AI bot disclosed in the Publication of Japanese Patent No. 6438612. Note that although the play-video recommending device is configured of one or more computers, a game server may be caused to function as the play-video recommending device.

For example, when a user whose deck includes cards constituting a card combination that occurs frequently in play logs fails to utilize that card combination, the play-video recommending device recommends a replay video of a scene in which the card combination is utilized. The situation in which the user fails to utilize the card combination can be determined from a low frequency of occurrence of the card combination in the game log of the user. This makes it possible for the user to know new card tactics seamlessly in the game.

The system 1 in this embodiment provides a technology that serves as a basis for a versatile combinatorial analysis system that is not specialized just for deck analysis but that may also be used for the analysis of access logs of a game server. This is because the system 1 provides a function for analyzing combinations of elements in a set consisting of a finite number of elements. The technology is widely applicable to systems that realize fun based on combinations of a finite number of elements, like games. As a method of applying the present invention to log analysis for games in general, instead of cards, server-side endpoint URLs that are accessed in a game are used as identifiers. For example, the URLs of game server APIs function as identifiers associated with specific game scenes, such as https://game.com/API/start, https://game.com/API/battle, and https://game.com/API/story/1. Furthermore, a game server constantly records access logs indicating which user has accessed the URLs in what order. Therefore, by analyzing which endpoint URLs are accessed by certain specific users per unit time, such as an hour or a day, it becomes possible for the system to recommend combinations of content preferred by the users to a user. For example, by implementing a system such that combinations of content preferred by users who play a game every day are recommended to a user who is going to leave the game, it becomes possible to prevent the user from leaving the game.

The operations and advantages described above also apply similarly to other embodiments and other examples unless otherwise specifically mentioned.

Another embodiment of the present invention may be a program for realizing the functions or the information processing shown in the flowcharts in the above-described embodiment of the present invention, or a computer-readable storage medium storing the program. Furthermore, another embodiment of the present invention may be a method for realizing the functions or the information processing shown in the flowcharts in the above-described embodiment of the present invention. Furthermore, another embodiment of the present invention may be a server that is capable of providing a computer with a program for realizing the functions or the information processing shown in the flowcharts in the above-described embodiment of the present invention. Furthermore, another embodiment of the present invention may be a virtual machine for realizing the functions or the information processing shown in the flowcharts in the above-described embodiment of the present invention.

In one example, the control device 10 and each of the computing devices 20 are configured to share a flag concerning the inference processing and to execute the additive inference processing and the subtractive inference processing in accordance with the value of the flag.

In one example, in the case where each of the computing devices 20 includes a processor 21 having r cores, the plurality of kinds of k-card sets received from the control device 10 are divided into r subsets before step 104. After the individual cores calculate frequencies in step 104, the computing device 20 joins the k-card sets and frequency information received from the individual cores, while sorting and arranging the k-card sets and frequency information, thereby performing merging. For example, the computing device 20 rearranges the plurality of kinds of k-card sets in descending order of the frequencies of occurrence. With this configuration, it is possible to further increase the speed of the inference processing.

Now, modifications of the embodiments of the present invention will be described. The modifications described below can be combined as appropriate and applied to any embodiment of the present invention as long as no inconsistency arises.

In one modification, the system 1 has the function of only either the additive inference processing or the subtractive inference processing. Also with this configuration, the system 1 can extract card combinations having high frequencies of occurrence at least for some numbers of cards.

In one modification, the system 1 extracts combination of a number of cards having high frequencies of occurrence, the number being greater than N/2, also in the additive inference processing, and extracts combinations of a number of cards having high frequencies of occurrence, the number being less than or equal to N/2, also in the subtractive inference processing.

In one modification, the control device 10 skips steps 101 and 201. Alternatively, the control device 10 rearranges the order of k-card sets according to a predetermined criterion. Note, however, that the control device 10 executes steps 101 and 201 in a preferred embodiment in order to avoid a bias in the order of array of card combinations.

In one modification, the first criterion is that in the case where k-card sets are selected in descending order of the frequencies of occurrence, k-card sets are selected until the sum of the frequencies of occurrence of the selected k-card sets reaches a preset predetermined value.

In one modification, when clustering the plurality of kinds of k-card sets merged in step 108 into a plurality of clusters, in the case where adjacent k-card sets include not less than a predetermined number of common cards, the control device 10 sets those k-card sets as a single cluster. In one modification, when clustering the plurality of kinds of k-card sets merged in step 108 into a plurality of clusters, the control device 10 performs clustering into a plurality of clusters by using another known clustering method.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 System
2 Network
10 Control device
11 Processor
12 Output device
13 Input device
14 Storage device
15 Communication device
16 Bus
20 Computing device
21 Processor
22 Output device
23 Input device
24 Storage device
25 Communication device
26 Bus
40 Game screen
41 Cards
42 First card group
43 Game field
44 Second card group
45 Character

The invention claimed is:

1. A system comprising:
a plurality of computing devices, wherein each computing device among the plurality of computing devices stores possessed medium group information concerning a plurality of possessed medium groups that are used by a plurality of predetermined users,
wherein a possessed medium group among the plurality of possessed medium groups is selected from a digital card set of all cards preset in a computer game and has a combination of arbitrary numbers of digital cards; and
a game server comprising a processor and a memory,
wherein the game server is configured to:
 manage a plurality of computer game operations over a network,
 obtain, within the plurality of computer game operations, a plurality of selections from the plurality of predetermined users regarding one or more selected digital cards during the plurality of computer game operations,
 store the possessed medium group information concerning the plurality of possessed medium groups, control parallel processing of a plurality of combinatorial operations of the plurality of computing devices, allocate and send a plurality of divided card sets constituted of a plurality of extracted media to the plurality of computing devices, wherein a first computing device among the plurality of computing devices is configured to:

calculate a plurality of card frequencies of occurrence of a divided card set among the plurality of divided card sets received from the game server by referring to the possessed medium group information, extract a card set having a predetermined frequency of occurrence satisfying a first criterion from the divided card set using a local filtering process to produce a first extracted card set, wherein the local filtering process is performed on the first computing device by excluding at least one combination of digital cards that cannot be contained in a digital medium set based on a card class, and send the first extracted card set to the game server, and wherein the game server is further configured to:

merge a first plurality of extracted card sets received from the plurality of computing devices to produce a plurality of merged sets, wherein the first plurality of extracted card sets comprise the first extracted card set from the first computing device, cluster the plurality of merged sets into a plurality of clusters, extract a second plurality of extracted card sets having the predetermined frequency of occurrence satisfying a second criterion for each cluster of the plurality of clusters using a global filtering process and the plurality of clusters, wherein the global filtering process arranges card combinations from the first plurality of extracted cards sets in descending order of frequency of occurrence, and wherein the global filtering process determines an upper limit to a total frequency in the plurality of clusters based on frequency information calculated by the plurality of computing devices, generate a plurality of new card sets by individually joining media included in a medium set to each of the second plurality of extracted card sets and individually excluding, from the plurality of new card sets, one or more digital cards from the possessed medium group based on the second plurality of extracted card sets, and allocate and send the plurality of new card sets to the plurality of computing devices, place, from the possessed medium group, at least one digital card from the plurality of new card sets in a game field within the computer game.

2. The system according to claim 1, wherein the game server is configured to be able to allocate and send media included in the medium set to the plurality of computing devices before allocating and sending sets constituted of a plurality of media to the plurality of computing devices, each computing device of the plurality of computing devices is configured to be able to calculate the plurality of card frequencies of occurrence of the individual media received from the game server by referring to the possessed medium group information, to extract media having the predetermined frequency of occurrence satisfying a third criterion from the received media, and to send the extracted media to the game server, and the game server is configured to be able to merge the media received from the plurality of computing devices, to generate a plurality of sets constituted of two media by individually joining media included in the medium set to each of the merged media, and to allocate and send the generated sets to the plurality of computing devices.

3. The system according to claim 1, wherein the game server is configured to be able to extract a plurality of sets constituted of N media from the possessed medium group of a plurality of users included in the possessed medium group information and to allocate and send the extracted sets to the plurality of computing devices, each computing device of the plurality of computing devices is configured to be able to calculate the plurality of card frequencies of occurrence of the sets received from the game server by referring to the possessed medium group information, to extract media having the predetermined frequency of occurrence satisfying the first criterion from the received sets, and to send the extracted media to the game server, and the game server is configured to be able to merge and output the sets received from the plurality of computing devices, and to be able to generate a plurality of new sets by individually excluding, from each of the merged sets, a single medium in the media constituting that merged set, and to allocate and send the generated sets to the plurality of computing devices, and wherein each computing device of the plurality of computing devices is configured to be able to calculate the plurality of card frequencies of occurrence of the sets received from the game server by referring to the possessed medium group information, to extract sets having the predetermined frequency of occurrence satisfying the first criterion, and to send the extracted sets to the game server, and the game server is configured to be able to merge the sets received from the plurality of computing devices, to cluster the merged sets into the plurality of clusters, and to extract sets having the predetermined frequency of occurrence satisfying the second criterion for each of the plurality of clusters, and is configured to be able to generate a plurality of new sets by individually excluding, from each of the extracted sets, a single medium in the media constituting that extracted set, and to allocate and send the generated sets to the plurality of computing devices.

4. The system according to claim 1, wherein the game server is configured to shuffle the order of array of media or sets before allocating the media or sets to the plurality of computing devices.

5. The system according to claim 1, wherein the first criterion is that in the case where sets are selected in descending order of the plurality of card frequencies of occurrence, sets are selected until the sum of the plurality of card frequencies of occurrence of the selected sets reaches a predetermined ratio of the sum of a plurality of calculated card frequencies of occurrence of the sets.

6. The system according to claim 1, wherein the game server merges the sets received from the plurality of computing devices while rearranging the sets in descending order of the plurality of card frequencies of occurrence, and clusters the merged sets into the plurality of clusters by applying agglomerative hierarchical clustering.

7. The system according to claim 1, wherein, when clustering the merged sets into the plurality of clusters, the game server sets adjacent sets in the merged sets as constituting one cluster in the case where the adjacent sets include not less than a predetermined number of common media.

8. The system according to claim 1,
wherein the game server is configured to be able to calculate, in extracting sets of media having the predetermined frequency of occurrence satisfying the second criterion, a cluster frequency ratio for each cluster of the plurality of clusters from the sum of the plurality of card frequencies of occurrence of the sets set in a corresponding cluster of the plurality of clusters, and
wherein the second criterion is that in the case where sets are selected in descending order of the plurality of card frequencies of occurrence, sets are selected until the sum of the plurality of card frequencies of occurrence of the selected sets reaches a predetermined value based on the cluster frequency ratios.

9. The system according to claim 2, wherein the third criterion is that in the case where media are selected in descending order of the plurality of card frequencies of occurrence, media are selected until the sum of the plurality of card frequencies of occurrence of the selected media reaches a predetermined ratio of the sum of a plurality of calculated card frequencies of occurrence of the media.

10. A method comprising:
managing, by a game server, a plurality of computer game operations over a network;
obtaining, by the game server and within the plurality of computer game operations, a plurality of selections from a plurality of predetermined users regarding one or more selected digital cards during the plurality of computer game operations;
storing, by the game server, possessed medium group information concerning a plurality of possessed medium groups,
wherein each computing device among a plurality of computing devices stores the possessed medium group information concerning the plurality of possessed medium groups that are used by the plurality of predetermined users,
wherein a possessed medium group among the plurality of possessed medium groups is selected from a digital card set of all cards preset in a computer game and has a combination of arbitrary numbers of digital cards;
controlling, by the game server, parallel processing of a plurality of combinatorial operations of the plurality of computing devices;
allocating and sending, by the game server, a plurality of divided card sets constituted of a plurality of extracted media to the plurality of computing devices;
calculating, by a first computing device among the plurality of computing devices, a plurality of card frequencies of occurrence of a divided card set among the plurality of divided card sets received from the game server by referring to the possessed medium group information;
extracting, by the first computing device, a card set having a predetermined frequency of occurrence satisfying a first criterion from the divided card set using a local filtering process to produce a first extracted card set,
wherein the local filtering process is performed on the first computing device by excluding at least one combination of digital cards that cannot be contained in a digital medium set based on a card class;
sending, by the first computing device, the first extracted card set to the game server;
merging, by the game server, a first plurality of extracted card sets received from the plurality of computing devices to produce a plurality of merged sets, wherein the first plurality of extracted card sets comprise the first extracted card set from the first computing device;
clustering, by the game server, the plurality of merged sets into a plurality of clusters;
extracting, by the game server, a second plurality of extracted card sets having the predetermined frequency of occurrence satisfying a second criterion for each cluster of the plurality of clusters using a global filtering process and the plurality of clusters,
wherein the global filtering process arranges card combinations from the first plurality of extracted cards sets in descending order of frequency of occurrence, and
wherein the global filtering process determines an upper limit to a total frequency in the plurality of clusters based on frequency information calculated by the plurality of computing devices;
generating, by the game server, a plurality of new card sets by individually joining media included in a medium set to each of the second plurality of extracted card sets and individually excluding, from the plurality of new card sets, one or more digital cards from the possessed medium group based on the second plurality of extracted card sets;
allocating and sending, by the game server, the plurality of new card sets to the plurality of computing devices; and
placing, by the game server and from the possessed medium group, at least one digital card from the plurality of new card sets in a game field within the computer game.

11. A system comprising:
a plurality of computing devices, wherein each computing device among the plurality of computing devices stores possessed medium group information concerning a plurality of possessed medium groups that are used by a plurality of predetermined users,
wherein a possessed medium group among the plurality of possessed medium groups is selected from a digital card set of all cards preset in a computer game and has a combination of arbitrary numbers of digital cards; and
a game server comprising a processor and a memory,
wherein the game server is configured to:
manage a plurality of computer game operations over a network,
obtain, within the plurality of computer game operations, a plurality of selections from the plurality of predetermined users regarding one or more selected digital cards during the plurality of computer game operations,
store the possessed medium group information concerning the plurality of possessed medium groups,
control parallel processing of a plurality of combinatorial operations of the plurality of computing devices,
allocate and send a plurality of divided card sets constituted of a plurality of extracted media to the plurality of computing devices,
wherein a first computing device among the plurality of computing devices is configured to:
calculate a plurality of card frequencies of occurrence of a divided card set among the plurality of divided card sets received from the game server by referring to the possessed medium group information,
extract a card set having a predetermined frequency of occurrence satisfying a first criterion from the divided card set using a local filtering process to produce a first extracted card set,
wherein the local filtering process is performed on the first computing device by excluding at least one combination of digital cards that cannot be contained in a digital medium set based on a card class, and
send the first extracted card set to the game server, and
wherein the game server is further configured to:
merge a first plurality of extracted card sets received from the plurality of computing devices to produce a plurality of merged sets, wherein the first plurality of extracted card sets comprise the first extracted card set from the first computing device,
cluster the plurality of merged sets into a plurality of clusters,
extract a second plurality of extracted card sets having the predetermined frequency of occurrence satisfying a second criterion for each cluster of the plurality of clusters using a global filtering process and the plurality of clusters,
wherein the global filtering process arranges card combinations from the first plurality of extracted cards sets in descending order of frequency of occurrence, and
wherein the global filtering process determines an upper limit to a total frequency in the plurality of clusters based on frequency information calculated by the plurality of computing devices,
generate a plurality of new card sets by individually subtracting media included in a medium set to each of the second plurality of extracted card sets and individually excluding, from the plurality of new card sets, one or more digital cards from the possessed medium group based on the second plurality of extracted card sets, and
allocate and send the plurality of new card sets to the plurality of computing devices,
place, from the possessed medium group, at least one digital card from the plurality of new card sets in a game field within the computer game.

12. A method comprising:
managing, by a game server, a plurality of computer game operations over a network;
obtaining, by the game server and within the plurality of computer game operations, a plurality of selections from a plurality of predetermined users regarding one or more selected digital cards during the plurality of computer game operations;
storing, by the game server, possessed medium group information concerning a plurality of possessed medium groups,
wherein each computing device among a plurality of computing devices stores the possessed medium group information concerning the plurality of possessed medium groups that are used by the plurality of predetermined users,
wherein a possessed medium group among the plurality of possessed medium groups is selected from a digital card set of all cards preset in a computer game and has a combination of arbitrary numbers of digital cards;
controlling, by the game server, parallel processing of a plurality of combinatorial operations of the plurality of computing devices;
allocating and sending, by the game server, a plurality of divided card sets constituted of a plurality of extracted media to the plurality of computing devices;
calculating, by a first computing device among the plurality of computing devices, a plurality of card frequencies of occurrence of a divided card set among the plurality of divided card sets received from the game server by referring to the possessed medium group information;
extracting, by the first computing device, a card set having a predetermined frequency of occurrence satisfying a first criterion from the divided card set using a local filtering process to produce a first extracted card set,
wherein the local filtering process is performed on the first computing device by excluding at least one combination of digital cards that cannot be contained in a digital medium set based on a card class;
sending, by the first computing device, the first extracted card set to the game server;
merging, by the game server, a first plurality of extracted card sets received from the plurality of computing devices to produce a plurality of merged sets, wherein the first plurality of extracted card sets comprise the first extracted card set from the first computing device;
clustering, by the game server, the plurality of merged sets into a plurality of clusters;
extracting, by the game server, a second plurality of extracted card sets having the predetermined frequency of occurrence satisfying a second criterion for each cluster of the plurality of clusters using a global filtering process and the plurality of clusters,
wherein the global filtering process arranges card combinations from the first plurality of extracted cards sets in descending order of frequency of occurrence, and
wherein the global filtering process determines an upper limit to a total frequency in the plurality of clusters based on frequency information calculated by the plurality of computing devices;
generating, by the game server, a plurality of new card sets by individually subtracting media included in a medium set to each of the second plurality of extracted card sets and individually excluding, from the plurality of new card sets, one or more digital cards from the possessed medium group based on the second plurality of extracted card sets;
allocating and sending, by the game server, the plurality of new card sets to the plurality of computing devices; and
placing, by the game server and from the possessed medium group, at least one digital card from the plurality of new card sets in a game field within the computer game.

* * * * *